Patented Nov. 21, 1950

2,531,046

UNITED STATES PATENT OFFICE 2,531,046

DEFLUORINATION OF PHOSPHATE ROCK

Clinton A. Hollingsworth, Lakeland, Fla., assignor to Coronet Phosphate Company, New York, N. Y., a corporation of New York No Drawing. Application April 26, 1946, Serial No. 665,347

5 Claims. (Cl. 71—38)

This invention relates to the defluorination of phosphate rock and has for its object the provision of a novel and improved method of defluorination.

Fluorine is present in practically all native phosphate rock, in amount varying in the different areas in which it occurs. The common Florida phosphate rock (e. g. pebble rock) usually contains from 3.5 to 4% of fluorine, around 75% bone phosphate of lime (B. P. L.), around 5% silica, around 5% calcium carbonate, around 2% iron and aluminum oxides, and the balance organic matter and other impurities. The fluorine is commonly believed to be present as calcium fluoride and also combined with the tricalcium phosphate as calcium fluorphosphate or fluorapatite ($Ca_{10}F_2(PO_4)_6$), and this combination is believed to be largely responsible for the low fertilizer efficiency of the raw rock (or concentrate), as evidenced by the customary ammonium citrate solubility test. Moreover, the high fluorine content of the raw rock makes it unsuitable as an animal feed or mineral supplement. Generally speaking, a fluorine content in excess of about 0.3%, or over 1 part of fluorine per 30 parts of phosphorus, makes a phosphatic material unsuitable as a mineral supplement.

I have discovered that the fluorine in fluorapatite is replaced by chlorine when the fluorapatite is heated to a temperature of from 1700 to 2200° F. in the presence of a suitable chlorine-containing agent. The fluorine may be thus replaced to a sufficient extent to permit the use of the defluorinated product as an animal feed or mineral supplement, since the substituted chlorine is non-toxic and unobjectionable. However, the substitution of chlorine for fluorine in fluorapatite does not break the bond of the apatite lattice, and the resulting chlorapatite has the same low fertilizer efficiency as fluorapatite. I have further found that the chlorapatite can be dechlorinated by calcination in the presence of water vapor, by substantially the same procedures heretofore proposed for the similar defluorination of fluorapatite, and when thus dechlorinated the phosphatic material has high fertilizer efficiency.

Based on these discoveries, my present invention, in one aspect, involves subjecting porous agglomerates of finely divided phosphatic material containing fluorapatite to the action of a gaseous chlorine-containing agent at a temperature of at least 1700° F., but not so high that substantial fusion takes place, and thereby replacing with chlorine a substantial amount of the fluorine in the fluorapatite, and thus converting the fluorapatite in large part to chlorapatite. The gaseous chlorine-containing agent should penetrate the entire body or charge of phosphatic material undergoing treatment. The chloridizing treatment is expedited by forming the finely divided phosphatic material into porous nodules which are readily penetrated by the gaseous chlorine-containing agent. The chlorine-containing agent may be chlorine gas, hydrochloric acid (hydrogen chloride) gas, or mixtures thereof, or other suitabe chlorine-containing gas. In another aspect, the invention involves further treatment of the resulting chlorapatite by calcination in the presence of water vapor until the phosphatic material is sufficiently dechlorinated to have high fertilizer efficiency. The calcining temperature of dechlorination is dependent, to some extent, upon the amount of silica present and the tendency of the charge to fuse, varying in general from at least 2500° F. to 3000° F. Temperatures so high as to cause substantial fusion or sintering should be avoided, since such fusion or sintering impedes effective penetration of the water vapor.

In carrying out the invention, the phosphate rock should be in a finely divided state, preferably so that at least 65% passes through a 200 mesh standard Tyler screen and all passes through a 65 mesh screen. While the phosphate rock may be subjected to the chloridizing treatment in its finely divided form, superior results are generally attained by forming the finely divided rock into nodules, pellets, briquets or the like. Nodulizing or the like may be carried out as a preliminary or preparatory operation or may be effected in situ immediately preceding the chloridizing treatment. For example, suitable nodules, generally round in shape and varying in diameter from $\frac{1}{16}$ to 1 inch, may be made by moistening the finely divided rock with water or other suitable liquid and tumbling at room temperature in a rotating cylinder, barrel or the like. From 12 to 18% by weight of water or the like, and generally around 15%, will sufficiently moisten the dry finely divided rock for producing satisfactory nodules by tumbling. Nodules may also be made by drying an aqueous slurry of the rock, and cutting the dried product into suitably sized cubes or other shapes. Nodules may also be made mechanically by briquetting or the like, although nodules so produced are generally too dense or compact for effective subsequent penetration of the gaseous chlorine-containing agent. When the chloridizing treatment is carried out in a rotary kiln, nodulizing may conveniently be effected in situ by making a slurry of the finely divided phosphate rock with from 40 to 50% by weight of water, and heating the slurry and evaporating the water in the low temperature end of the rotating kiln.

The chloridizing treatment can be carried out in any suitable apparatus, such as a rotary kiln, electric furnace, shaft furnace, sintering machine etc. The multiple hearth shaft furnace disclosed in the copending patent application of one of us (Maust) Ser. No. 679,178 filed June 25, 1946, is a particularly suitable type of apparatus for the practice of the invention. In whatever apparatus employed, intimate and continuous association of the chloridizing agent with the entire body or charge of phosphatic material undergoing treatment is necessary. As rapidly as chloridizing agent is consumed in the operation, fresh chloridizing agent must be available to instantly replace that consumed, and free evolution of any gaseous products is necessary. Heating in the presence of the chloridizing agent is thus continued until the desired substitution of chlorine for fluorine is attained. In general, the higher the temperature the shorter is the required detention period at that temperature to effect the contemplated defluorination and chlorination. With most phosphate rocks a treatment temperature of from 2000° F. to 2400° F. and a detention period of from 15 to 30 minutes gives excellent results. Too high a temperature may cause such substantial fusion or sintering of the charge as to seriously impede or even prevent effective penetration of the gaseous chloridizing agent throughout the entire body thereof, and hence should be avoided.

The invention, in its broad aspect, is illustrated in the following examples in which the phosphate rock was a Florida pebble phosphate of which the following is a typical analysis:

| | Per cent |
|---|---|
| Total $P_2O_5$ | 35.10 |
| Insoluble ($SiO_2$) | 4.69 |
| $Fe_2O_3$ and $Al_2O_3$ | 2.50 |
| Fluorine | 3.42 |

Fineness, 70% minus 200 mesh.

The finely ground phosphate rock was made up into a slurry, dried and cut up into ⅜ inch cubes. The cube nodules were introduced into an electrically heated furnace, and hydrochloric acid gas and air were passed through the nodules while maintained at the indicated different treatment temperatures. Fluorine determinations were made after the indicated time intervals at each treatment temperature.

| Minutes at Treatment Temperature | Percent fluorine with Treatment Temperature of— | | | |
|---|---|---|---|---|
| | 2,000° F. | 2,200° F. | 2,400° F. | 2,600° F. |
| 10 | 1.42 | .62 | .45 | .26 |
| 20 | .40 | .12 | .06 | .07 |
| 30 | .21 | .06 | .02 | |

When the finely divided phosphatic material is nodulized, the nodules should preferably have a high degree of porosity in order that the gaseous chlorine-containing agent may effectively penetrate throughout the entire mass of each individual nodule. A desired degree of porosity may be obtained by mixing the phosphatic material with some substance that volatilizes upon the application of heat, such as ammonium carbonate, or sulphur which burns off as sulphur dioxide, or one of a large variety of high fusion sulphates, carbonates, halides etc. which lose water of hydration upon heating. Porosity may also be obtained by mechanical means such as the addition of a frothing agent (e. g. soya bean extract, egg albumen etc.) to an aqueous slurry of the finely divided phosphatic material, and then vigorously agitating the slurry, whereupon the slurry dries with a fluffy or porous structure.

I prefer, however, to impart porosity to the nodules by the invention of the copending patent application of Ernest J. Maust and myself, Ser. No. 665,348 filed April 26, 1946. In accordance with that invention, a highly effective porosity is imparted to the nodules by including from 5 to 50% by weight of carbonaceous material in the nodules and eliminating substantially all of the carbon of the carbonaceous material by reaction with water vapor at a temperature in excess of 1800° F. with evolution of the resulting gaseous products. At that temperature, the water vapor reacts with the hot carbon of the carbonaceous material with the evolution of hydrogen and carbon monoxide, in much the same way that water gas is formed. The heat treatment in the presence of water vapor is continued until the nodules are decarbonized for all practical purposes, that is until substantially all of the carbon has been eliminated, leaving the nodules with the desired degree of porosity. The decarbonizing temperature may advantageously be from 2000 to 2400° F. Too high a temperature should be avoided, since it may cause a loss of phosphorus through reduction of the phosphatic material by carbon, or may cause such substantial fusion or sintering of the nodules as to impede effective penetration of the water vapor throughout the mass of each individual nodule, with the result that all of the carbon is not eliminated. On the other hand, a slight amount of sintering is advantageous since it imparts a desired amount of strength to the decarbonized porous nodules. Thus, in the case of most finely divided phosphate rocks, incipient sintering takes place at about the same temperatures at which the water vapor reacts with the carbonaceous material, and this slight incipient sintering is sufficient to convert the nodules into relatively hard clinkers. Hence, when porosity is attained by the removal of carbon, the clinkered nodules are sufficiently strong to withstand subsequent handling without disintegration in the chloridizing kiln or furnace, as well as in any subsequent dechlorinating kiln or furnace.

A wide variety of carbonaceous materials are available for imparting porosity to the nodulized charge. Among these may be mentioned, by way of example, bituminous or anthracite coal, coke, charcoal, lamp black and other forms of carbon, liquid and solid petroleum products, waste sulphite liquor, flour, distillery slops, sawdust, ground up grape fruit peelings etc. Solid carbonaceous materials are crushed (when necessary) and finely ground, preferably so that at least 75% passes through a 200 mesh standard Tyler screen, and substantially all passes through a 65 mesh screen. At least 5% by weight of carbonaceous material is required to impart any effective degree of porosity to the nodules, and generally from 10% up to 40% is preferred. The higher the percentage of carbonaceous material initially included in the nodules, the higher will be the porosity of the decarbonized nodules.

The following examples illustrate the ease of chloridizing when porosity is imparted to the nodules by decarbonizing initially included carbonaceous material. The Florida pebble rock, of the approximate analysis hereinbefore mentioned, was mixed with 40% by weight of a high grade (volatile matter about 29%, ash content about 7%) bituminous coal ground to about 52% minus 200 mesh, and the mixture made up into generally round nodules about ⅜ inch in diameter. The carbon of the coal was then removed by heating the nodules in the presence of water vapor at a temperature of about 2200° F., resulting in very porous and slightly clinkered nodules. The nodules were cooled, and then heated in an electric furnace in contact with a stream of hydrochloric acid gas and air continuously passed through the nodulized charge. Fluorine determinations were made at the different treatment temperatures after various time intervals of treatment.

| Minutes at treatment temperature | Percent fluorine with treatment temperature of— | | | | |
|---|---|---|---|---|---|
| | 1,600° F. | 1,700° F. | 1,800° F. | 2,000° F. | 2,200° F. |
| 5 | | | | .82 | .34 |
| 10 | | | .84 | .34 | .10 |
| 20 | | .93 | .31 | .02 | .02 |
| 30 | .67 | .30 | .05 | .02 | .02 |
| 45 | .68 | .26 | | | |

It will be noted from the foregoing examples that increasing the treatment temperature to 2200° F. very greatly reduces the detention period for substantially complete defluorination. Comparison with the previously recited examples shows that with the charge of highly porous nodules, substantially complete defluorination can be effected at a lower treatment temperature (for the same detention period), or in a shorter time interval (at the same treatment temperature).

In the following examples, porosity was imparted to the nodules by a soya bean foaming agent. The finely ground Florida pebble rock was made into a slurry with water to which the foaming agent was added and the mixture fluffed up, dried and cut up into ⅜ inch cube nodules. The porous cube nodules were heated in an electric furnace in an atmosphere of hydrochloric acid gas and air, as in the preceding examples.

| Minutes at treatment temperature | Percent fluorine with treatment temperature of— | | |
|---|---|---|---|
| | 2,100° F. | 2,200° F. | 2,300° F. |
| 5 | .50 | .40 | .36 |
| 10 | .38 | .12 | .16 |
| 20 | .02 | .02 | .02 |
| 30 | .02 | .02 | .02 |

In the following examples, the finely ground Florida pebble rock was mixed with 40% by weight of finely ground bituminous coal, and the mixture made up into generally round nodules about ⅜ inch in diameter. The nodules were then decarbonized by treating in an atmosphere of water vapor for 20 minutes at a temperature of 2200° F. The resulting porous and slightly clinkered nodules, after cooling, analyzed as follows:

| | Percent |
|---|---|
| Total $P_2O_5$ | 36.26 |
| Insoluble matter ($SiO_2$) | 6.00 |
| Fluorine | 1.86 |
| $Fe_2O_3$ and $Al_2O_3$ | 4.70 |

A charge of these porous nodules was then reheated in an atmosphere of hydrochloric acid gas and air for 20 minutes at a temperature of 2200° F. The defluorinated (and now chlorinated) nodules, after cooling, analyzed as follows:

| | Percent |
|---|---|
| Total $P_2O_5$ | 35.94 |
| Availability in 0.4% HCl solution | 34.80 |
| Availability in neutral ammonium citrate, A. O. A. C. official method | 5.52 |
| Availability in 2.0% citric acid | 19.90 |
| Insoluble matter ($SiO_2$) | 5.00 |
| $Fe_2O_3$ and $Al_2O_3$ | 4.10 |
| Fluorine | .06 |
| Chlorine | 5.40 |

It will be seen from the foregoing analysis that the chloridizing treatment reduces the fluorine content of the phosphatic material to well below the tolerable amount permissible for its use as an animal feed or mineral supplement, and the full availability of the phosphorus content ($P_2O_5$) for this use is shown by the solubility in 0.4% hydrochloric acid (HCl) solution. Additionally, the chloridizing treatment removes some silica as well as some iron and aluminum. However, the fertilizer efficiency of the chlorinated phosphatic material remains about as low as in the original fluorapatite, as shown by the ammonium citrate solubility. The chlorinated phosphatic material can be dechlorinated and its phosphorus content ($P_2O_5$) made highly available as a fertilizer by the procedures heretofore perfected for defluorinating phosphate rock by calcination in the presence of water vapor, such, for example, as described in the copending patent application of Ernest J. Maust, Ser. No. 530,156, filed April 8, 1944, issued as Patent No. 2,446,978 on August 10, 1948 and in the applications of Maust and myself Ser. Nos. 665,344, filed April 26, 1946 issued as Patent No. 2,479,389 on August 16, 1949, 665,345 filed April 26, 1946, now abandoned, and 665,346 filed April 26, 1946 issued as Patent No. 2,478,200 on August 9, 1949. Thus the chlorinated nodules, produced in the foregoing example, were calcined in the presence of water vapor at a temperature in excess of 2550° F. but not so high that substantial fusion or sintering took place. The analysis of the thus dechlorinated nodules was as follows:

| | Per cent |
|---|---|
| Total $P_2O_5$ | 37.46 |
| Availability in 0.4% HCl solution | 37.44 |
| Availability in neutral ammonium citrate, A. O. A. C. official method | 35.94 |
| Availability in 2% citric acid | 36.50 |
| Fluorine | .04 |
| Chlorine | .01 |

While hydrochloric acid gas, preferably in conjunction with air, was the chloridizing agent used in all of the foregoing examples, chlorine gas and water vapor give equally good results. The chemical reaction appears to be merely an interchange of the fluorine and chlorine between the apatite and the chloridizing agent. The fluorine is evolved principally, if not solely, as hydrofluoric acid (HF) gas, and hence the need for water vapor when chlorine gas is the chloridizing agent. The fluorine may be recovered as in the aforementioned processes for defluorinating phosphate rock. However, since for economical operation, any excess chloridizing agent should be recovered and recycled, the gaseous product of the chloridizing treatment is preferably first treated to condense or otherwise appropriately recover the hydrofluoric acid gas, and the residual gaseous product is then recycled through the chloridizing apparatus, or appropriately treated for recovery of its chlorine content in whatever form present. The recovered chlorine may be reused in the chloridizing treatment.

Hydrochloric acid gas and chlorine, for the practice of the invention, may be produced in various ways. For example, hydrochloric acid gas may be generated by the action of sulphuric acid on sodium chloride, or by the decomposition of ammonium chloride by heating. Hydrated magnesium chloride ($MgCl_2 \cdot 6H_2O$) may be decomposed by heat and the resulting chlorine-containing gas used as the chloridizing agent. Liquid chlorine is a suitable source of chlorine gas.

When nodulizing the finely divided phosphatic material, it is advantageous to mix from 0.5 to 2.0% by weight of bentonite with the material in order to impart a desirable degree of hardness and strength to the dried nodules to withstand subsequent handling, and to prevent objectionable dusting of the nodulized charge during chloridizing, especially in a rotary kiln. Some phosphate rocks, such for example as Florida pebble rock and especially the phosphate rocks from North Africa, have when finely ground sufficient natural colloidal constituents to form strong nodules upon drying, and hence require but a small addition (e. g. 0.5%) of bentonite. On the other hand, phosphate rocks of the apatite type have little or no natural colloidal constituents, and as much as 2% by weight of bentonite may advantageously be mixed with the phosphatic material to impart the desired degree of strength to the dried nodules.

I claim:

1. The method of defluorinating phosphate rock containing fluorapatite which comprises finely grinding the rock and forming it into porous agglomerates, heating the porous agglomerates of finely-ground rock to a temperature of at least 1800° F. but not so high that substantial fusion takes place, heating the agglomerates to maintain them at such temperature and simultaneously subjecting them to intimate contact with a chloridizing agent selected from the class consisting of hydrochloric acid gas and chlorine gas, replacing the chloridizing agent consumed in the operation as rapidly as it is consumed, continuing the treatment of the agglomerates at such temperature in intimate and continuous contact with the chloridizing agent for a period of at least ten minutes and until the fluorine in the fluorapatite is replaced by chlorine and evolved as hydrofluoric acid gas to an extent such that the fluorine content of the agglomerates is reduced to less than 0.3%, and then withdrawing the resultant chlorapatite from the chloridizing and heating zone, the agglomerates undergoing treatment being sufficiently porous to permit effective penetration of the chloridizing agent and free escape of the evolved hydrofluoric acid.

2. The method of claim 1 in which the chloridizing agent is hydrochloric acid gas.

3. The method of claim 1 in which the chloridizing agent is chlorine gas in the presence of water vapor.

4. The method of defluorinating phosphate rock containing fluorapatite which comprises finely grinding the rock and forming it into porous agglomerates, heating the porous agglomerates of finely-ground rock at a temperature of from about 2000° F. to about 2400° F. in the absence of substantial fusion, heating the agglomerates to maintain them at such temperature and simultaneously subjecting them to intimate contact with chlorine gas in the presence of water vapor, replacing the chlorine gas consumed in the operation as rapidly as it is consumed, continuing the treatment of the agglomerates at such temperature in intimate and continuous contact with chlorine gas and water vapor for a period of at least ten minutes and until the fluorine in the fluorapatite is replaced by chlorine and evolved as hydrofluoric acid gas to an extent such that the fluorine content of the agglomerates is reduced to less than 0.3%, and then withdrawing the resultant chlorapatite from the chloridizing and heating zone, the agglomerates undergoing treatment being sufficiently porous to permit effective penetration of the chlorine gas and free escape of the evolved hydrofluoric acid.

5. The method of defluorinating phosphate rock containing fluorapatite which comprises finely grinding the rock and forming it into porous agglomerates, heating the porous agglomerates of finely-ground rock at a temperature of from about 2000° F. to 2400° F. in the absence of substantial fusion, heating the agglomerates to maintain them at such temperature and simultaneously subjecting them to intimate contact with hydrochloric acid gas, replacing the hydrochloric acid gas consumed in the operation as rapidly as it is consumed, continuing the treatment of the agglomerates at such temperature in intimate and continuous contact with hydrochloric acid gas for a period of at least ten minutes and until the fluorine in the fluorapatite is replaced by chlorine and evolved as hydrofluoric acid to an extent such that the fluorine content of the agglomerates is reduced to less than 0.3%, and then withdrawing the resultant chlorapatite from the chloridizing and heating zone, the agglomerates undergoing treatment being sufficiently porous to permit effective penetration of the hydrochloric acid gas and free escape of the evolved hydrofluoric acid.

CLINTON A. HOLLINGSWORTH.

REFERENCES CITED

The following references are of record in the file of this patent:

UNITED STATES PATENTS

| Number | Name | Date |
| --- | --- | --- |
| 1,111,490 | Perino | Sept. 22, 1914 |
| 1,174,176 | Newberry et al. | Mar. 7, 1916 |
| 1,396,149 | Soper | Nov. 8, 1921 |
| 1,902,832 | Caldwell | Mar. 28, 1933 |
| 2,061,639 | Seyfried | Nov. 24, 1936 |
| 2,093,176 | Tromel | Sept. 14, 1937 |

OTHER REFERENCES

Mellor, "Comprehensive Treatise on Inorganic and Theoretical Chemistry," vol. II, Longmans, New York, 1922, p. 5.